United States Patent [19]

Presbie

[11] Patent Number: 4,845,991

[45] Date of Patent: Jul. 11, 1989

[54] HYDRAULIC CLEARANCE MEASUREMENT SYSTEM

[75] Inventor: Edward W. Presbie, Bloomfield, Conn.

[73] Assignee: Combustion Engineering, Inc., Windsor, Conn.

[21] Appl. No.: 945,119

[22] Filed: Dec. 22, 1986

[51] Int. Cl.$^4$ .............................................. G01B 13/12
[52] U.S. Cl. .................................................... 73/37.5
[58] Field of Search ................. 376/245, 248; 33/502; 73/37.5, 37.8, 37.6

[56] References Cited

U.S. PATENT DOCUMENTS

| | | | |
|---|---|---|---|
| 2,684,568 | 7/1954 | Senger | 73/37.6 |
| 2,852,849 | 9/1958 | Groener | 73/37.5 |
| 2,953,918 | 9/1960 | Flower et al. | 73/37.5 |
| 3,194,055 | 7/1965 | Knobel | 73/37.5 |
| 3,682,191 | 8/1972 | Lechner, Jr. | 73/37.6 |
| 3,754,433 | 8/1973 | Hyer | 73/37.6 |
| 3,757,563 | 9/1973 | Kampf et al. | 73/37.5 |
| 4,108,719 | 8/1978 | Olshausen | 73/789 |
| 4,142,401 | 3/1979 | Wilson | 73/37.5 |
| 4,235,110 | 9/1980 | Dau et al. | 73/579 |
| 4,658,633 | 4/1987 | Freer | 73/37.5 |

FOREIGN PATENT DOCUMENTS

| | | | |
|---|---|---|---|
| 1141462 | 12/1962 | Fed. Rep. of Germany | 73/37.5 |
| 45637 | 6/1963 | Fed. Rep. of Germany | 73/37.5 |
| 47910 | 10/1979 | Japan | 376/258 |

Primary Examiner—Michael J. Tokar
Assistant Examiner—Hezron E. Williams
Attorney, Agent, or Firm—John H. Mulholland

[57] ABSTRACT

Two pressurized fluid system orifices in series (48,50), one (50) having a variable effective flow area ($A_2l$) provide a proportionate measurement of a gap (x) between a nuclear reactor vessel (12) and a core support barrel (20) by means of the variation of pressure in the intermediate chamber (44) between them. A transducer (T) or a pressure gage (P) senses the proportionate pressure.

8 Claims, 3 Drawing Sheets

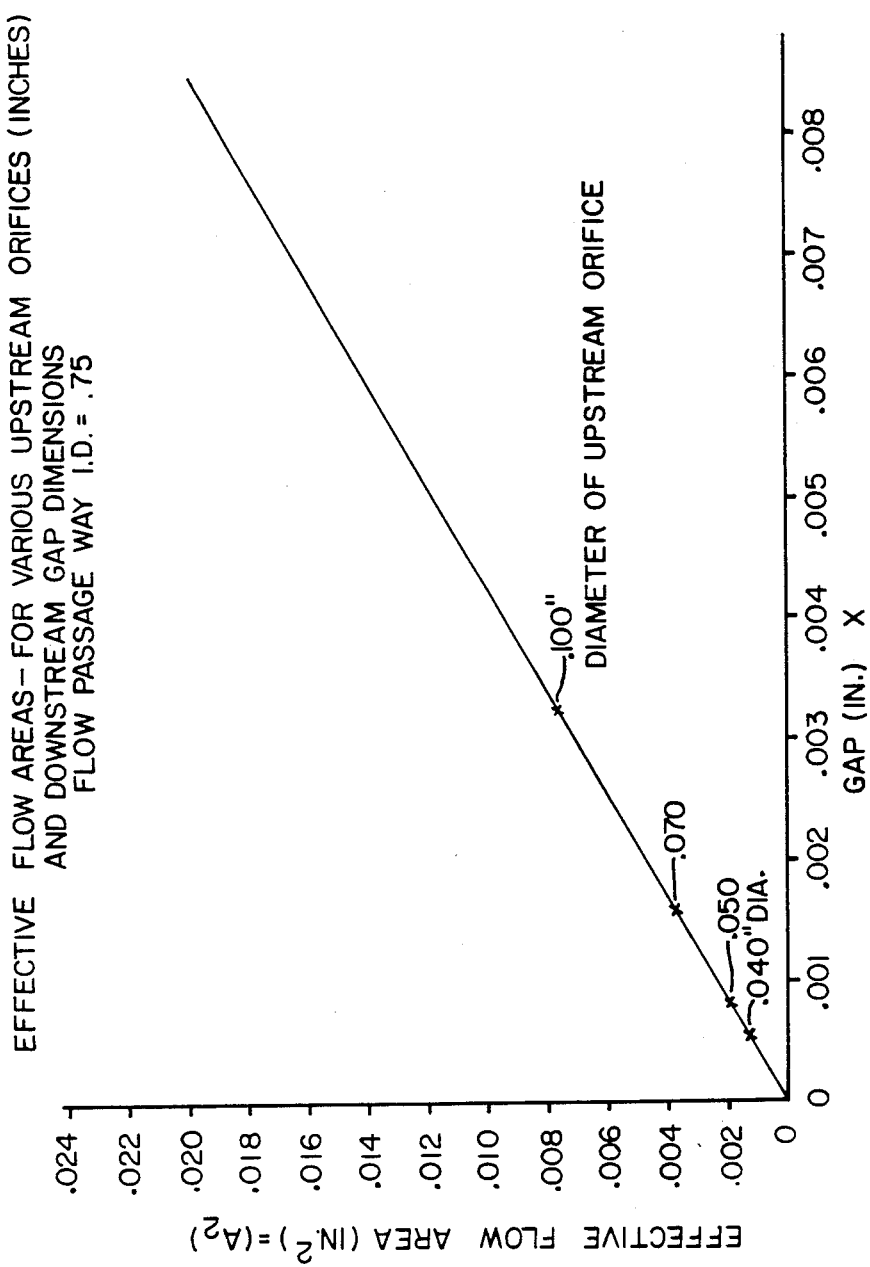

HYDRAULIC CLEARANCE MEASUREMENT SYSTEM

BACKGROUND OF THE INVENTION

The invention relates to a system for measuring the movement between a nuclear reactor core support barrel and adjacent reactor structure such as the reactor vessel surrounding the barrel.

Nuclear reactor vessel walls are, typically, annular vertically oriented metallic structures having an inner annular core support barrel supported from an integral flange thereof at the top of the reactor vessel wall in closely spaced relation to the annular inside surface of the vessel. A plurality of core stabilizer lugs or reactor vessel snubber lugs, or both, are located at spaced positions around and within the annular space between the reactor vessel and the core barrel to insure that an adequate annular space is maintained.

It is desirable and important to maintain a gap between the annular core barrel on one side and the opposing structure, be it a reactor wall, mating snubber structure, lug or thermal shield guide pin, on the other side of the annular space. Accordingly, there is a need to provide a means and method of measuring the clearance between the core barrel and the reactor vessel structure or other reactor internal structure. For example, measurements between a reactor vessel wall lug and the core barrel wall within the vessel at a plurality of peripheral points would be useful.

Schemes utilizing conventional ultrasonics and electrical contacts have been proposed for this purpose. However, it is known that gas turbine engine fuel control systems utilize yet a third principal to be investigated. The instant invention utilizes that third principal, namely, two orifices in series in which the downstream orifice's effective area is variable.

SUMMARY OF THE INVENTION

It has been discovered that by analogizing the gap between the nuclear reactor vessel structure and the core barrel structure, for example, two orifices in series in which the gap acts as the variable downsrream orifice, an effective measuring system for determining the gap between the reactor vessel structure and the core barrel structure is provided.

The invention, for the example given, is an hydraulic clearance measurement method and means which features an hydraulic fluid flow system having a fluid conducting path which includes two orifices in series, the downstream orifice being provided by the circumferential area determined by the gap between the reactor vessel core stabilizer surface and the core barrel. The measuring system's flow conducting path includes an intermediate chamber between the inlet orifice and outlet orifice. Means sense the pressure in the intermediate chamber and thereby indicate variations in the gap proportionate to that pressure.

Motion of the core support barrel relative to the other reactor structures is induced by flow of coolant in the reactor. The snubbers restrain extremes of this motion. During initial installation in the field, shims are fitted to limit the motion of the barrel with respect to the reactor vessel, typically, to a maximum of 0.020 inch (0.05 cm.) on a side.

Under reactor vessel fit-up conditions, reactor coolant fluid is supplied to the fluid flow measurement system from a pressure source. The intermediate pressure existing between the two orifices is, according to the principal utilized, a function of the gap. This intermediate pressure is converted to an electrical signal by means of a suitable electrical output linear variable differential transducer whose output signal would be fed into a computer from which the gap of one or several such signals from around the periphery may be obtained to establish the uniformity or nonuniformity of the mechanical stop created gaps about the circumference. The system is also utilized during reactor vessel operating conditions during which the gap variations on either side of the core barrel due to the motions under dynamic conditions are observed and recorded.

The advantages of the concept over ultrasonic or electrical contact systems is one of practicality in that electrical wiring and connections do not lend themselves as well, if at all, during non-contact or reactor vessel operating conditions. The present system is:

1. unaffected by changes in temperature or bulk modulus;
2. unaffected by the radiation environment; and,
3. relatively rugged with respect to surviving the reactor vessel operating conditions.

Moreover, once installed, the present system can provide information: (a) during installation; (b) during subsequent shut down periods; and (c) during reactor operation.

BRIEF DESCRIPTION OF THE DRAWINGS

FIG. 3 is a chart illustrating effective flow areas for various upstream orifices and downstream gap measurements for a typical flow passageway internal diameter of 0.75 inches (1.9 cm.).

DESCRIPTION OF THE PREFERRED EMBODIMENT

Figure 1:
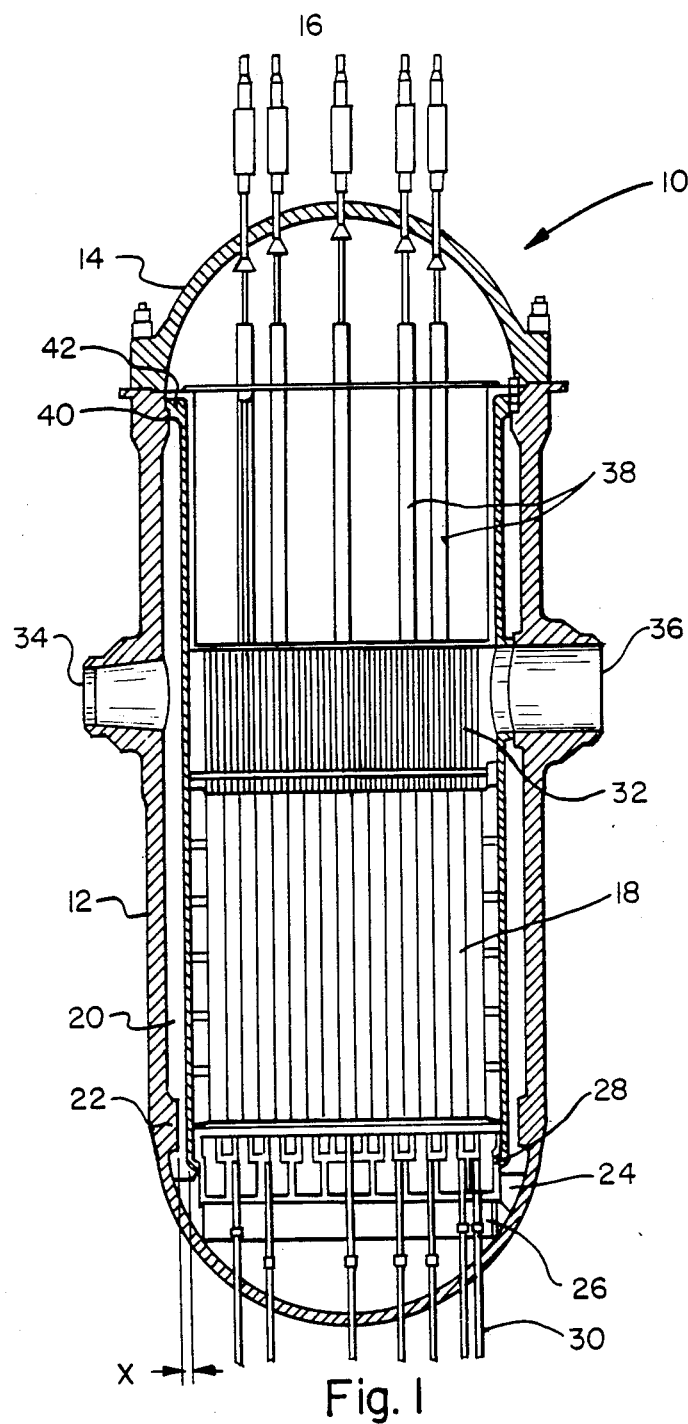
FIG. 1 is a schematic cross-sectional elevational view of a typical nuclear reactor with a gap x to be measured by the hydraulic clearance measurement system of the invention.

The numeral 10 generally designates a nuclear reactor of the type with which the hydraulic clearance measurement system of the invention may be utilized. The reactor 10 includes, typically, a reactor vessel 12 and closure 14 therefor having control drive mechanisms 16 extending therefrom. Within the reactor vessel 12 is a centrally located reactor core 18 comprising a plurality of fuel assemblies. These are located within a core support barrel 20 which is annularly spaced from the internal wall of the reactor vessel 12. Snubbers 22 are built into the lower portion of the reactor vessel shell 12 to limit the amplitude of any displacement of the core support barrel 20 as may occur from the flow of coolant water through the reactor during operation. Suitable lower core stops 24 and a flow skirt 26 are also typically present in the structure, as is other lower core support structure 28 located at the lower end of the core support barrel 20.

In-core instrumentation nozzles 30 penetrate the reactor vessel and extend into the core area of the reactor in well known manner. Located above the core 18 are control element shroud tubes 32, an inlet nozzle 34 and an outlet nozzle 36. Located above the control element shroud tubes 32 can be seen the various control element shrouds 38 of the control element assembly.

The core support barrel 20 is suspended from a ledge 40 by means of an upper flange thereof 42 adjacent the joint of the reactor vessel 12 with the closure 14. Motion of the core support barrel 20 induced by coolant flow within the reactor vessel 12 is restrained by means of the snubber blocks 22 which would typically engage some mating mechanical structure of suitable mechanical design. During initial installation, the barrel 20 is shimmed with respect to the vessel 12 to limit the motion of the barrel with respect to the vessel to a maximum of approximately 0.020 inch (0.05 cm.) on a side.

As will be seen from the drawings, whatever mechanical structure, such as is represented by a snubber lug 22 in the drawings, a gap x to accommodate motion of the barrel 20 relative to the nuclear vessel 12 must be provided. The hydraulic clearance measurement system for measuring the gap x between the core support barrel 20 and opposing nuclear reactor structure spaced therefrom such as the nuclear reactor vessel 12 and its snubber or lug 22, includes a fluid flow system having a fluid conducting path 44. The fluid flow conducting path 44 lies partially within the snubber 22 and is a flow passageway of circular cross-section having an intenal diameter of 0.75 inches (1.9 cm). In the described example, the flow passageway 44 has a source of pressurized fluid of, for example, 15 psi at its upstream end 46. The pressure supply is indicated by an arrow. Downsteam of the pressurized fluid supply and the end 46 of the fluid conducting path 44 is a fluid inlet orifice 48 having a first opening area $A_1$. In the case of a circular orifice 48 which would be formed by a restriction having an opening of circular cross-section, the area $A_1$ can, of course, easily be calculated.

Figure 2:
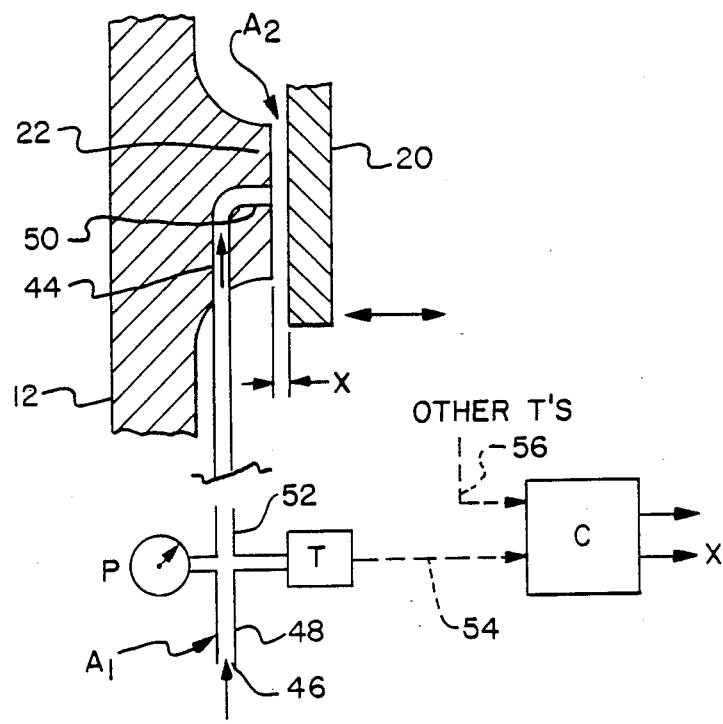
FIG. 2 is a schematic diagram and enlarged fragmentary portion illustrating the gap x and the hydraulic clearance measurement system arrangement for measuring it.

A fluid outlet orifice 50 in the fluid conducting path 44 downstream of the fluid inlet orifice 48 is provided in the nuclear vessel wall snubber 22 opposite the core barrel structure 20. The downstream orifice 50 has an effective flow area $A_2$ larger than that of area $A_1$ which is calculated by multiplying the circumference of the diameter of the circular cross-section flow passageway 44 times the gap x. The flow passageway 44 has an intermediate chamber portion 52 which makes up its volume between the inlet orifice 48 and the downstream outlet orifice 50. In fluid communication with the chamber 52 is a means for sensing pressure variations in that chamber. As seen in FIG. 2, two means are shown. One is a pressure gage marked P and the other is a linear variable differential transducer T with an electrical output connection to a computer C. The intermediate chamber pressure 52 between the orifices 48 and 50 is, because of the utilized phenomena, a function of the gap x. Therefore, by means of a suitable transducer which may be obtained, for example, from Data Instruments, 4 Hartwell Place, Lexington, Mass., an electrical signal can be sent to computer C via an electrical connection 54 to provide the gap x.

In like manner, other transducers from like fluid conducting paths with arrangements of inlet orifices, outlet orifices, intermediate chambers and pressure sensing means, such as transducer T, may be connected to computer C, via schematically indicated electrical conduit 56, such that the gap at a plurality of places about the core barrel may be established and monitored. The computer connection itself makes up no part of the invention, but is merely ilustrative of the use of the transducer produced electrical signal. The pressure gage illustrated as connected to the intermediate chamber 52 would provide an immediate visual reading or other is proportionate to the gap x. Those skilled in the art will readily see the value of use, for their intended application, of either the pressure gage P or the electrical output transducer T.

The chart of FIG. 3 illustrates a desirable situation with regard to the upstream orifice 48. Normally, the upstream orifice 48 is substantially smaller than the downstream orifice 50. FIG. 3 illustrates that an upstream orifice of 0.100 inches (0.25 cm.) could be utilized for indicating a gap in excess of 0.003 inches (.0076 cm). This is meaningful, primarily, because a diameter smaller than 0.100 inches (0.25 cm.) may clog too easily to be practical in nuclear reactor vessel structure use. As shown by the chart, however, the diameter of the upstream orifice can be made large enough while the gap x in inches can be measured with sufficient sensitivity to be meaningful for the intended purposes. Thus, it will be seen that utilizing the principal of two orfices in series an effective measurement of the gap x between the core support barrel 20 and the nuclear vessel snubber 22 can be made.

I claim:

1. An hydraulic clearance measurement system for measuring a designated x, which gap is located between a core support barrel structure and other nuclear reactor structure spaced therefrom comprising:
    a pressurized fluid flow system having a fluid conducting path;
    a fluid inlet orifice in said fluid conducting path having a first opening area, $A_1$;
    a fluid outlet orifice downstream of said fluid inlet orifice having an effective flow area, $A_2$, larger than $A_1$;
    an intermediate chamber in said fluid conducting path between said inlet orifice and said outlet orifice; and,
    means for sensing pressure variations in said intermediate chamber, which variations are proportionate to said gap x.

2. The system of claim 1 in which a plurality of said fluid conducting paths with said arrangement of inlet orifices, outlet orifices, intermediate chambers and pressure sensing means are included.

3. The system of claim 2 in which the pressure sensing means all transmit signals to a common data recording device.

4. The system of claim 1 in which the pressure sensing means is a linear variable differential transducer with an electrical output.

5. The system of claim 1 in which the pressure sensing means is a pressure gage.

6. The system of claim 1 in which the outlet orifice is partially defined by a reactor vessel snubber.

7. The system of claim 1 in which the flow passageway is circular in cross-section at the outlet and the effective flow area, $A_2$, of the outlet orifice is defined by the gap x times the circumference of the flow passageway.

8. The system of claim 1 in which the upstream orifice is circular in cross-section and its diameter exceeds 0.100 inches (0.25 cm.).

* * * * *